United States Patent
Madura

[11] 3,847,414
[45] Nov. 12, 1974

[54] FRONT BEARING BLOCK ASSEMBLY FOR TRACTOR FIFTH WHEEL

[75] Inventor: Francis Eli Madura, Whiting, Ind.

[73] Assignee: AMSTED Industries Incorporated, Chicago, Ill.

[22] Filed: Dec. 19, 1973

[21] Appl. No.: 425,987

[52] U.S. Cl. .............................................. 280/437
[51] Int. Cl. .......................................... B62d 53/08
[58] Field of Search ................................... 280/437

[56] References Cited
UNITED STATES PATENTS
2,621,056  12/1952  Kayler .............................. 280/437
2,756,074  7/1956  Kayler .............................. 280/437

Primary Examiner—Leo Friaglia

[57] ABSTRACT

A front bearing block assembly for a tractor fifth wheel assembly comprising generally a fifth wheel plate having coupling jaws including a rear locking jaw and an intermediate locking jaw mounted for translatory movement and a stationary front bearing block assembly including a front locking jaw projecting from one face of a bearing block. A shank of varying lengthwise cross section and terminating in a bulbular-like end projects from the opposite face. The front bearing block assembly includes a resilient buffer block having a slot along the upper face. The slot receives the shank and has a cross section varying along the length thereof in substantially the same manner as the shank but of about the same area so as to resiliently grip the latter.

4 Claims, 4 Drawing Figures

PATENTED NOV 12 1974 3,847,414
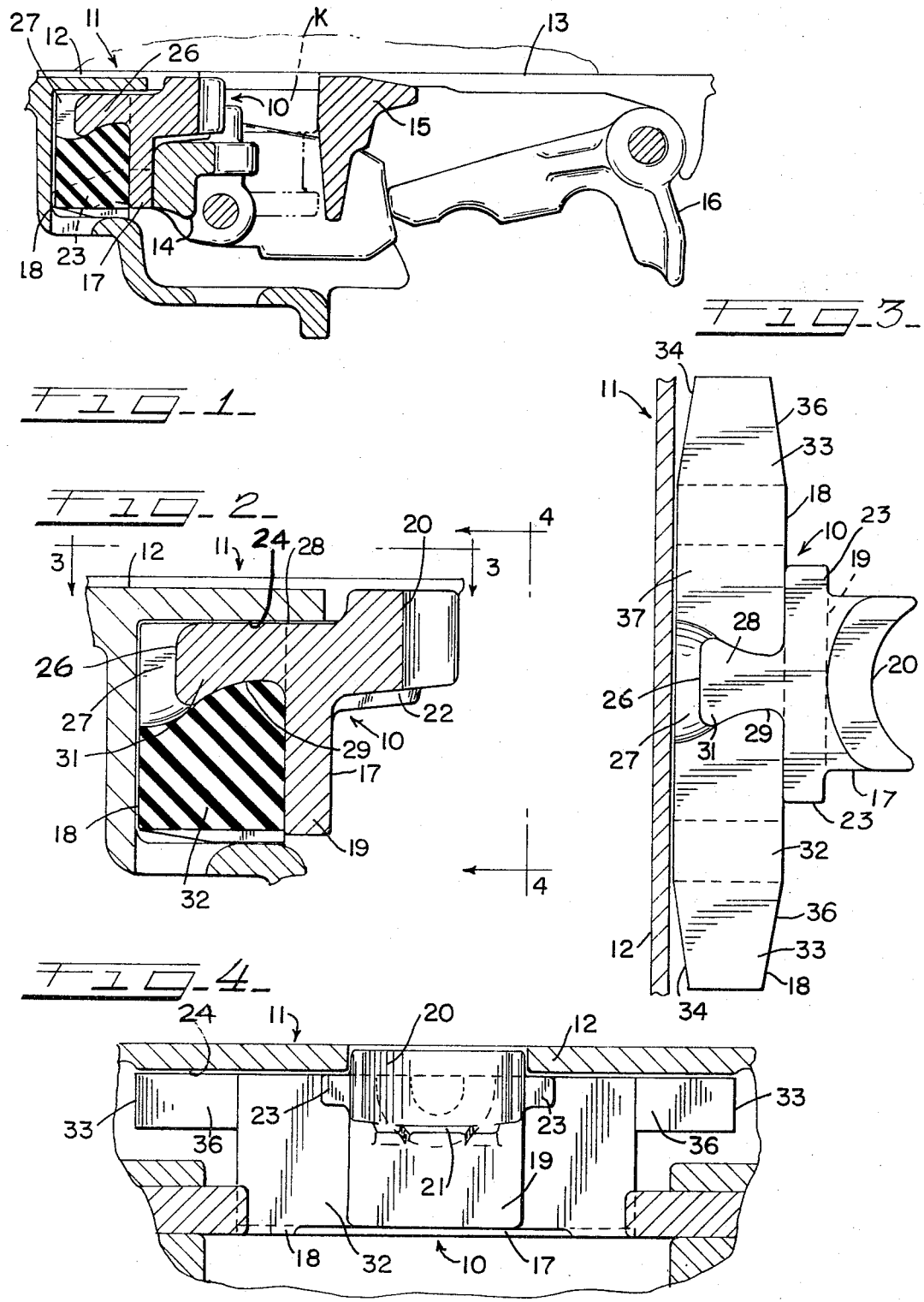

FRONT BEARING BLOCK ASSEMBLY FOR TRACTOR FIFTH WHEEL

BACKGROUND AND SUMMARY OF THE INVENTION

The present invention relates to fifth wheel assemblies of the type used in the coupling of tractors and semi-trailers and more particularly, to an improved front bearing block assembly for such fifth wheel assemblies.

Fifth wheel assemblies of the type to which the present invention relates are exemplified in U.S. Pat. No. 2,756,074. These fifth wheels include a pair of translatory movable jaws and a fixed or stationary jaw provided on a front bearing block. The front bearing block is supported in a resilient buffer block which is disposed to absorb the impacts imposed on the stationary jaw by the king pin depending from the semi-trailer.

Heretofore, the front bearing block has been provided with a forwardly projecting shank for mounting on the resilient block. The shank was seated in an opening extending through the center of the buffer block thereby to be completely embraced therein. While this prior structure was generally satisfactory in operation, difficulties have been encountered in retaining the shank seated within the buffer block opening.

By the present invention it is proposed to provide a new and improved arrangement for mounting the front bearing block on the resilient buffer block.

This is accomplished generally by the provision of a front bearing block assembly for a fifth wheel comprising a bearing block having a front jaw formed on one face and a shank projecting from the opposite face. The shank is formed with a varying cross section along its length to define a necked-in section terminating in a bulbular-like section at the free terminal end thereof. The shank is seated within a slot extending along the upper end of a resilient buffer block. The slot is contoured similarly and about the same cross-sectional area as the shank to resiliently confine and grip the latter therein.

Further features of the invention will appear hereinafter.

BRIEF DESCRIPTION OF THE DRAWINGS

FIG. 1 is a longitudinal cross section view of a fifth wheel assembly showing the front bearing block assembly of the present invention incorporated therein;

FIG. 2 is an enlarged cross section view of the bearing block assembly;

FIG. 3 is a top plan view taken generally along the lines 3—13 of FIG. 2;

FIG. 4 is a cross-sectional view taken generally along the lines 4—4 of FIG. 2.

BRIEF DESCRIPTION OF THE PREFERRED EMBODIMENT

The front bearing block assembly 10 incorporating the structure of the present invention is shown embodied in a fifth wheel assembly 11. The fifth wheel assembly is of the type disclosed in the aforementioned U.S. Pat. No. 2,756,074 to which reference is made for a more detailed description. Generally, the fifth wheel assembly comprises a fifth wheel plate 12 having a king pin receiving slot 13. Disposed about the slot 13 along the underside is an intermediate jaw 14 and a rear jaw 15. The intermediate jaw 14 and rear jaw 15, are mounted for translatory movement in response to movement of the king pin K into the slot 13 to a closed position and to an open position when the king pin K moves outwardly of the slot 13. In the closed position a lock 16 turnably supported on the plate 12 retains the rear jaw 15 in the position retaining the rear jaw in an upright position, as shown, so that the king pin K is captured within the slot 13.

When disposed in the slot 13 the king pin K bears against the front bearing block assembly 10. The front king bearing block assembly 10 comprises a bearing block 17 and a resilient buffer block 18 located in a chamber behind the bearing block 17 to absorb the buffing impacts imposed thereon and also to take-up the play of the king pin when the intermediate jaw 14 and rear jaw are in the locked position as shown in FIG. 1.

The bearing block 17 comprises a vertical rectangular plate 19 having a rearwardly facing arcuate front coupling jaw 20 projecting from the upper end of one face thereof, and receives the king pin K of the semi-trailer. A recess 21 defined by downward facing ribs 22 is formed on the underside of the coupling jaw 20. The recess 21 accommodates a lug on the intermediate jaw 14 when the latter is in the locked position. The jaw 20 projects slightly above the upper edge of the plate 19 so as to provide a maximum gripping surface about the king pin K. A pair of laterally extending lugs 23 project from the sides of the plate 19 and are engageable with the top wall 24 of the fifth wheel plate 12 to restrain turning of the bearing block 17 about its horizontal axis and lifting upwardly.

A shank 26 projects forwardly from the upper edge of the plate 17 and is received in a slot 27 formed in the resilient buffer block 18, as more fully to be explained hereinafter. As shown, the shank 26 is of varying cross section along its length so as to provide a horizontal flat upper surface 28 and a depending generally semi-cylindrical surface 29 having a varying radius to form a necked-in portion. The generally semi-cylindrical surface or necked-in portion 29 merges with a bulbular-like enlarged terminal end 31.

The resilient buffer block 18 is made from rubber or the like and is accommodated within the chamber provided on the underside of the fifth wheel plate 12. The buffer block 18 includes a rectangular block section 32 of substantially uniform thickness and a pair of block ears 33 extending from the opposite sides along the upper end. The front and rear faces 34 and 36, respectively, of the ears 33 may be slightly tapered toward each other as shown in FIG. .

The slot 27 is formed in the upper portion of the block substantially midway of the rectangular block section 32 and opens into the upper surface 37. The slot 27 is shaped generally similarly to the lengthwise contour of the shank 26. However, the cross sectional area along the length of slot 27 that accommodates the shank 26 therein is about the same as the corresponding cross-sectional area of the shank 26. This relationship of the cross-sectional areas of the slot 27 and shank 26 assures that the latter remains securely gripped in the slot 27. At the same time the open-sided slot 27 facilitates the insertion of the shank 26 therein. The bulbular end 31 seated in the slot 27 also resists longitudinal movement of the shank outwardly thereof.

It should be readily apparent that the front bearing block 17 is resiliently restrained against downward movement as well as rotational movement about the longitudinal axis of the shank 26 so that the corresponding movement of the king pin K when coupled in the jaws is correspondingly restrained. It is also to be noted that the buffer block 18 is disposed in the chamber such that the flat surface 28 of the shank 26 is located directly beneath the top wall of the fifth wheel plate. Should the movement of the king pin K be such that the shank 26 is tilted upwardly so as to tend to release from the slot 27, this tendency will be yieldably restrained by the gripping action of the rubber and the overlying wall of the fifth wheel plate.

It should be understood that the arrangement described above constitutes the preferred embodiment and that many adaptations and modifications may be made without departing from the spirit of the invention.

What is claimed is:

1. In a fifth wheel assembly having a fifth wheel plate, a rear jaw and an intermediate jaw mounted on said fifth wheel plate for translatory movement between an open and a closed position, and a front bearing block assembly, the improvement wherein said front bearing block assembly comprises a bearing block having a substantially rectangular plate, a front coupling jaw projecting from the upper end of one side of said plate, a shank projecting from the upper end of the other side of said plate, said shank having lengthwise varying cross-sectional areas to provide a necked-in portion along the major portion of the length of said shank and a bulbular-like terminal end, a resilient buffer block having a slot along the upper end thereof receiving said shank, said slot being shaped approximately the same as said shank with the lengthwise cross-sectional areas accommodating said shank being about the same as the corresponding cross-section area of said shank thereby to resiliently grip and retain said shank in said slot.

2. The invention as defined in claim 1 wherein said shank is formed with a flat upper surface which lies substantially coplanar with the upper face of said resilient buffer block.

3. In a front bearing block assembly for a fifth wheel having a top plate with a king pin slot opening rearwardly and having a pocket beneath said plate forwardly of said slot, the top of said pocket being defined by said plate; the combination of a resilient block confined in said pocket, said block having a recess in the top thereof tapering rearwardly, and a bearing block having a shank complementary in form to that of said recess, tightly fitted therein, and retained therein by said plate at the top of said pocket, said bearing block having a jaw rearwardly of said pocket and facing rearwardly to engage an associated king pin.

4. A bearing block assembly according to claim 3 wherein the front end of said shank and the complementary surface of the resilient block in said recess are of bulbular-like form.

* * * * *